Oct. 25, 1960 G. M. GIBSON 2,957,372
SELECT SPEED ACCESSORY GROUP DRIVE
Filed June 5, 1953 3 Sheets-Sheet 1
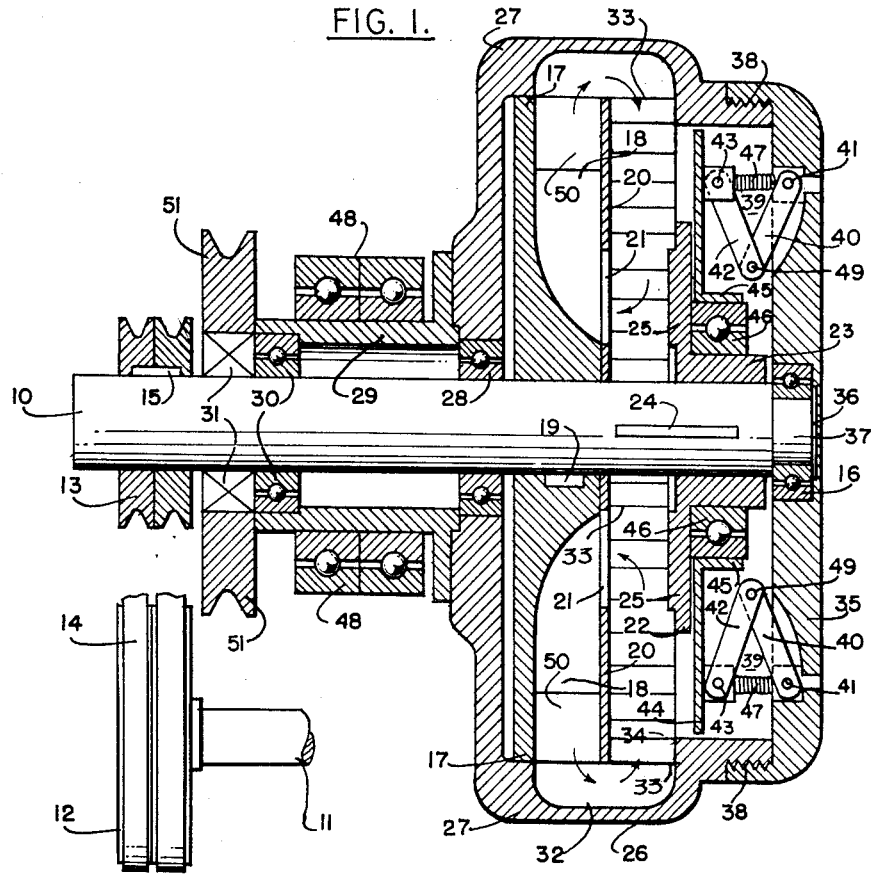
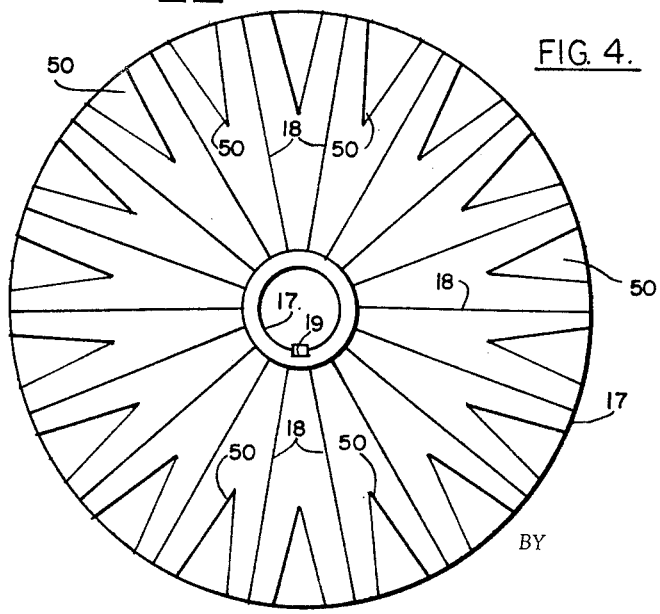
INVENTOR
GORDON M. GIBSON
BY *Moore & Hall*
ATTORNEYS

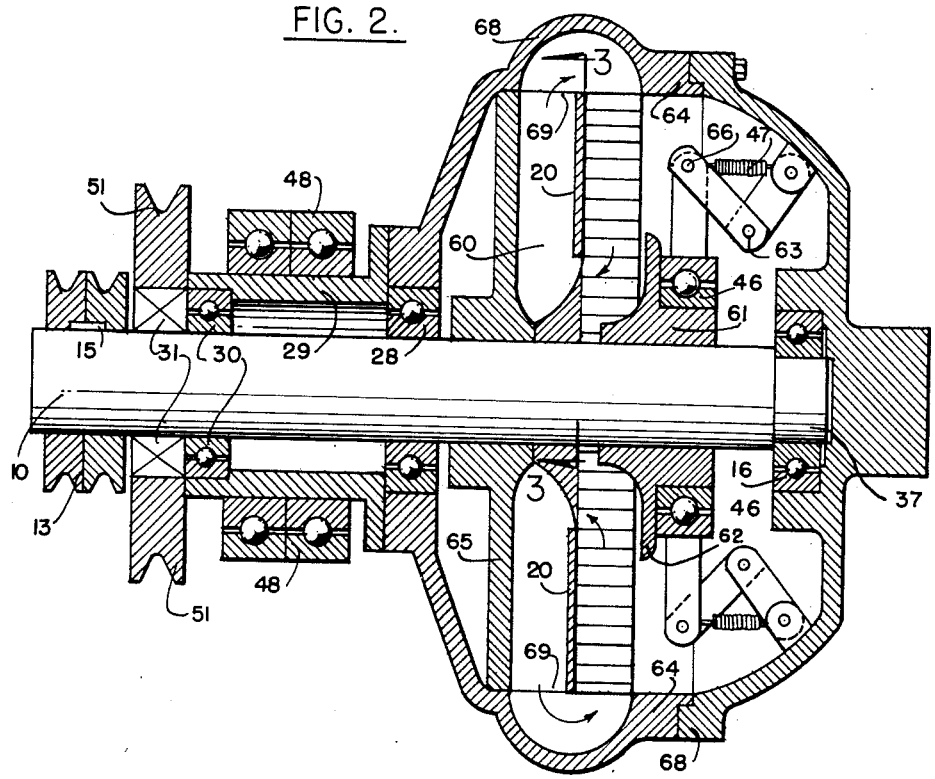
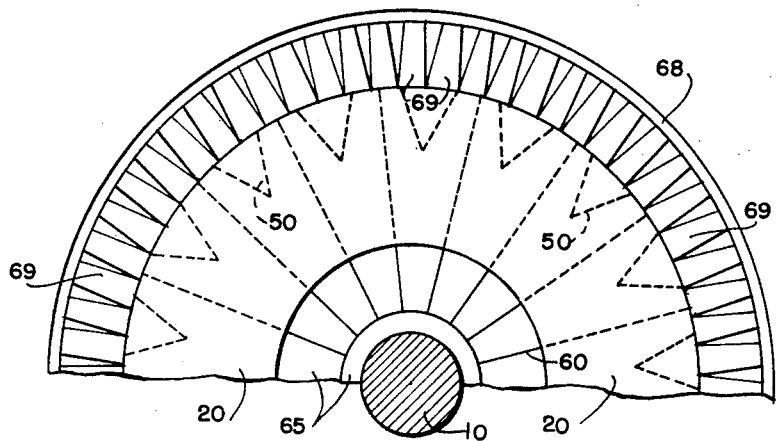

Oct. 25, 1960 G. M. GIBSON 2,957,372
SELECT SPEED ACCESSORY GROUP DRIVE
Filed June 5, 1953 3 Sheets-Sheet 3
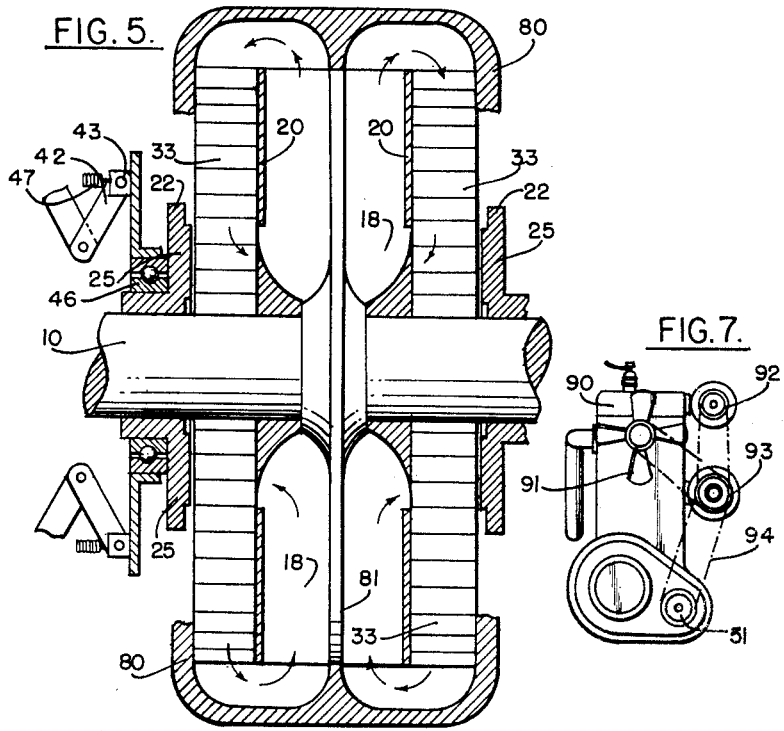
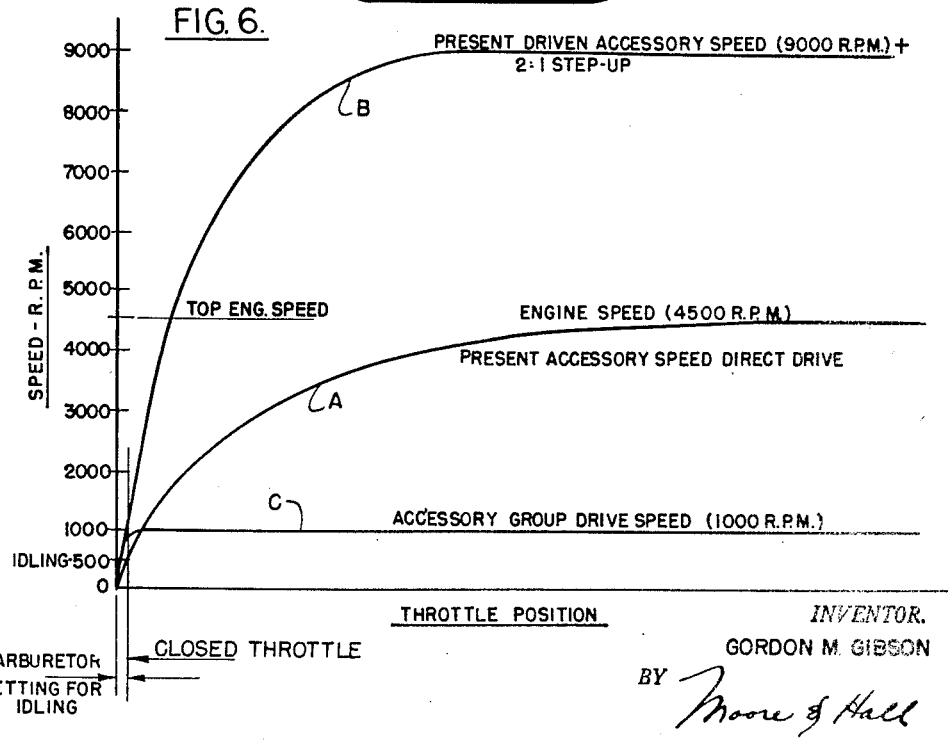
INVENTOR.
GORDON M. GIBSON
BY
Moore & Hall
ATTORNEYS

United States Patent Office 2,957,372
Patented Oct. 25, 1960

2,957,372

SELECT SPEED ACCESSORY GROUP DRIVE

Gordon M. Gibson, 740 Venice, San Antonio 1, Tex., assignor to Gordon M. Gibson, as trustee, San Antonio, Tex.

Filed June 5, 1953, Ser. No. 359,934

14 Claims. (Cl. 74—722)

The present invention concerns a constant speed accessory group drive for internal combustion engines.

It is an object of the invention to provide means whereby all the accessories on an internal combustion engine are driven at a substantially constant optimum speed for all engine speeds from idling speed to full horse power output at top speed.

Although the invention finds its principal application in the automotive field there are individual instances such as air compressors and refrigeration to which it may be adapted.

It is an object of the invention to provide a counter shaft which is to be driven by the drive shaft or the crank shaft of the engine at a step-up ratio of 2:1 or 3:1 so as to provide a suitable substantially constant r.p.m. for automotive accessories at engine idling speeds and all driving speeds. The counter shaft may be belt driven or geared directly to the drive or crank shafts. Mounted on the counter shaft is a fluid coupling with means to control the flow of fluid therein so as to give the output drive of the device a flat or substantially constant speed characteristic independent of motor speed. This is accomplished by providing one or more members splined to the counter shaft and movable axially under the action of a centrifugal governor to constrict the passage of the fluid flow in the fluid coupling. For the purposes of the present invention the term fluid is taken to mean a liquid, oil being preferred.

Present day automobiles are being increasingly loaded with accessories which now include an engine fan, a generator and battery combination, a radio, radio-telephone, air conditioning, air compressors, oil pumps for servo operation such as automatic shift, automatic top operation, window raising, built-in jacks, power-steering, power brakes, trunk compartment and the like. Where these devices are electrically operated their motors or solenoids draw on the battery or generator. Of these the generator, fan, compressor and pumps must be designed to operate satisfactorily at engine idling speeds and continue to operate satisfactorily at top engine speeds. The result of such design and arrangement is to limit car performance severely. This is true because even though at their optimum speeds the total power consumption of the accessories is only a few horse power, at high speed the parasitic power consumption by accessories may be as high as twenty-five horse power or ten to twenty percent of the engine output.

It is an object of the invention to provide means to operate each accessory at its individual optimum speed and to maintain that speed quite independent of either engine speed or car speed.

As a result of the invention:

(1) The entire electric system of the car is supplied with substantially constant voltage from idle to top engine speed. This enables a manufacturer to redesign the generator to give better performance at less cost. The generator could be a sixty cycle alternator, so that standard house hold appliances could be operated in or by the vehicle with the engine idle or the car moving at full speed.

(2) Constant voltage permits better lights and radio performance. Ignition is improved because there is constant high primary voltage.

(3) The battery is fully charged at all times giving long life and preventing sulphation. This in turn yields better starting of the engine particularly in cold weather because not only is the battery kept at peak charge, but only the motor is turned over and not the whole accessory group.

(4) There is far better cooling under most unfavorable conditions as the fan operates at peak efficiency with the engine at idling speed. The manufacturer need no longer compromise, but can design a fan for a given speed which is both quiet and efficient. With increased fan efficiency the radiator core can in some cases be reduced by as much as fifteen to twenty percent. An automotive fan as now driven consumes six or seven horse power at top engine speed.

(5) Power steering is most needed when the car is being parked at low engine speed and maximum resistance to turning by tire drag. The invention provides trouble free power steering when needed for parking without the large parastic loss due to pumping of oil even with a by-pass at high speed.

(6) There is more available horsepower for better performance at fast cruising speeds and improved mileage and acceleration at moderate speed. This is true because the accessory load is a constant chosen for optimum accessory performance and there is no added load as speed increases due to friction losses which add nothing to accessory performance and absorb upwards of twenty percent of horsepower output at high speed. Much of accessory work is required in traffic, when parking, starting or stopping at which time the engine is at relatively low or idling speed.

(7) Where compressor equipment is used for brakes and refrigeration known requirements and a constant speed of equipment permits the design of equipment with greatly improved performance. Constant output permits the use of smaller and better compressors.

(8) Driven accessory equipment not only gives better performance but enjoys an increased useful life because it is never rotated needlessly at incredible and useless speeds. For example equipment which must be designed to operate satisfactorily for an engine idling at 500 r.p.m. is rotated as high as 12,000 r.p.m. when a car is at top speed. This introduces a speed factor of eight or ten. Wear and friction loss vary exponentially with speed. The invention opens up a whole new field of useful and appealing new appliances for use in car or trailer. It frees design from crippling limitations which increase cost and make good performance difficult to achieve and transitory when attained.

The figures in the drawing are intended to be illustrative of the presently preferred forms the invention may take and are not intended to be limiting. Like numerals refer to like parts throughout.

In the drawings:

Fig. 1 is an elevation in section of one form of the invention comprising constant speed rotary drive means utilizing fluid drive means for driving an accessory group at a preselected substantially constant optimum speed.

Fig. 2 is an elevation in section of a modification of Fig. 1.

Fig. 3 is a partial section taken along line 3—3 of Fig. 2.

Fig. 4 is a plan view of one form of impeller.

Fig. 5 is a section of coupling using a double impeller.

Fig. 6 is a graph representation showing the effect of the invention on accessory group speed as compared with car speed.

Fig. 7 is an end elevation of a motor with the accessory drive mounted thereon.

A counter shaft 10 is driven from engine output shaft or crank shaft 11 by means of double pulleys 12 and 13 with suitable belting 14. Pulleys 13 are one-half to one-third the diameter of pulleys 12 to give counter shaft 10 a speed of about a thousand to twelve hundred r.p.m. when the engine of crank-shaft 11 is operating at idling speed. Pulleys 13 are keyed to counter shaft 10 as at 15.

Counter shaft 10 is journaled in suitable bearings including end bearing 16. An impeller member 17 having radial blades 18 is keyed to counter shaft 10 by key 19. Although key 19 is not so shown in Fig. 1, it may be made a feather key or spline for certain modifications of the invention. Blades 18 are die cast integrally with impeller 17 and carry an annular guide member 20 normal to the axis of shaft 10 having a central aperture 21.

Also carried by shaft 10 is a plate 22 having a hub 23 slidable axially but restrained by feather key or spline 24. Plate 22 carries a finished annular projecting portion 25 which is designed to fit within and snugly to close the passage 21.

An outer housing 26 is constructed of a part 27 journaled on shaft 10 by bearings 28 and has attached thereto a hub 29 spaced from shaft 10 and mounted on bearings 30. A suitable oil seal is provided as at 31. Housing part 27 has a curved annular portion 32 provided with a series of buckets 33 corresponding to twice the number of the spaces between radial fins 18. Guide member 20 may be attached to the edges of buckets 33 and carried by housing part 27 instead of by the radial blades 18 as discussed above, if desired. As shown in Fig. 1, buckets 33 while shallow are wider than the effective part of blades 18 and empty into an annular space 34 on the opposite side of guide member 20 from blades 18.

A second part 35 of housing 26 is provided with a recess 36 to receive bearing 16 and a reduced end portion 37 of shaft 10. Parts 26 and 35 are press fitted or threaded together as at 38. A massive linkage 40, 42 and 49 in duplicate provides a suitable centrifugal governor action. An arm 40 is anchored to part 35 at pivot 41 and arm 42 is pivoted at 43 to annular plate 44 having an open flanging or hub 45 rotatably mounted on hub 23 by bearing 46. Arms 40 and 42 have sufficient mass to overcome the action of tension spring 47 and are pivoted together at 49. A tension spring 47 of about two pounds pull urges the pivots 41 and 43 together, carrying plate 22, portion 25 and plate 44 to the right in Fig. 1.

Part 27 of outer housing 26 and hub 29 rotate together and constant speed take-off pulley 51 is mounted at the outer end of hub 29. Bearing member 48 surrounding hub 29 and supports the entire assembly for rotation, including counter-shaft 10.

The operation of the device of Fig. 1 is as follows:

Crank-shaft 11 turns at engine speed under the control of an accelerator or throttle not shown. The engine normally idles at 400 to 500 r.p.m. and has a top speed between 4000 and 5000 r.p.m. Counter shaft 10 rotates at twice engine speed or more depending upon the ratio of pulleys 12 and 13. Counter shaft 10 rotates impeller 17 and blades 18 which act on oil or equivalent liquid within housing 26 which is more than half full for normal operation. In the absence of oil pulleys 13 would rotate counter shaft 10, impeller 17 with its blades 18 and cover plate 20 together with cover plate 25. Cover plate 25 is held to the right by springs 47 acting through bearings 46 which permit relative motion between hub 23 carrying plate 25 and plate 44 mounted by open flanging 45 on the outer race of bearing 46. Pulley 47, housing 27, with its buckets 33, linkages 39 and plate 44 stand still until oil is added.

As blades 18 rotate they act on the oil and move it radially around the axis of shaft 10. As the oil has mass it tends to move away from the center of rotation along a tangential line. The velocity of the moving oil may be represented by a vector which has a component normal to the plane of the drawing of Fig. 1. As the oil strikes the buckets 33 it is deflected into channel 34 on the opposite side of guide plate 20 and continues around through annular opening 21 to be acted on by blades 18 again. The normal component of the oil velocity just referred to acts on the walls of buckets 33 at right angles to the plane of the paper and rotates the housing 26 and hub 29 on bearings 16, 28 and 30.

As housing 26 starts to rotate springs 47 have positioned plate 25 apart from annular passage 21 in plate 20, so that the oil passage is unrestricted. As housing 26 rotates arms 40 and 42 tend to move outwardly against the action of spring 47 and act through bearing 46 to move the plate 22 and valve projection 25 toward annular passage 21. It should be noted that although the centrifugal assembly and plate 44 rotate with housing 26, plate 22 is keyed to shaft 10 and turns with it. Bearings 16 and 46 allow for a difference in speeds of rotation of these members.

As engine speed approaches idling speed, for example 500 r.p.m., counter shaft 10 approaches 1000 r.p.m., depending upon the drive ratio of pulleys 12 and 13. The mass of arms 40 and 42, comprising the linkages 39, is sufficient to overcome spring 47 and move annular projection very close to annular passage 21 thereby restricting the flow of oil in the path as shown by the arrows. In this manner the normal force exerted by the moving oil on buckets 33 is maintained at a constant value within reasonably narrow limits and housing 26 and output pulley 51 rotate at, for example 1000 r.p.m. when the engine idles. As shown in Fig. 6 the speed build up of shaft 10 is rapid, the knee of the group curve is highly critical at or just below idling speed and thereafter is substantially flat for all engine speeds. As the load on pulley 51 increases, housing 26 slows down slightly together with arms 40, 42 and springs 47 widen the distance between plates 20 and 22 very slightly. The amount of oil required to be circulated to drive housing 26 is quite small and during normal operation the projection 25 and the edge of plate 20 forming passage 21 are very close together. The regulation obtained is sensitive, but has the necessary stability to maintain the flatness of curve C. The substantially constant speed of pulley 51 is used to drive the required accessories with the results outlined above.

Figs. 3 and 4 show the use of nozzling wedges 50 which are preferably applied to the periphery of impeller 17 to increase the velocity of oil flow just before it strikes buckets 33 so as to maximize the energy transfer and increase the efficiency of the coupling.

It will be appreciated that other constructions may be utilized to achieve the same or an equivalent result.

Fig. 2 shows a slightly different arrangement in which the oil path is valved more smoothly. In Fig. 2 the inner part of blades 60 are curved to receive the projection 61 of plate 62 which is moved axially by governor 63 in the same manner as plate 22 and projection 25. Buckets 69 receive the oil moved outwardly by blades 60 and are rotated by the tangential component of the velocity of the impinging oil. A cylindrical portion 64 is shown to illustrate how the parts of Fig. 2 can be easily reversed and the impeller 65 be speed governed by connection to governor 63 at pivots 66. Where the impeller member 65 is reversed and moved axially relative to cylindrical portion 64 it will be noted that a variable part of blades 60 will be effective in pumping oil into buckets 69 of the movable housing member 68. Although the governor linkage 40, 42 of Fig. 1 as well as that of governor 63 of Fig. 2 may be provided with additional masses such as the rotating balls usually associated with a governor, it has been found in practice that the mass of the linkage is itself sufficient to give effective control movement to the members 25 and 61, respectively.

In Fig. 5 two impellers such as 17 or 65 are mounted back to back and valving members such as 25 or 61 are to be mounted on each side for axial movement toward each other to control oil flow in response to governor action as in Figs. 1 and 2. A double housing 80 cooperates with division disk 61 to guide the oil and to direct its action.

Fig. 7 shows the invention mounted on an in line engine. Engine 90 has a crank-shaft geared or otherwise connected to counter shaft 10 at a two or three to one step-up drive. Constant speed drive pulley 51 rotates fan 91, generator 92 and oil pump 93 at constant speed by a suitable belt drive 94. It will be noted that the drive 95 can rotate each accessory at a constant speed, but not necessarily all at the same speed. Although the water pump for cooling the engine may be driven at engine speed if desired it is contemplated that it also can be driven with advantage at constant speed by the invention.

Fig. 6 shows the relative speed characteristics in r.p.m. plotted against throttle position. It will be noted that a closed throttle is offset to the right of the origin in normal operation because for most passenger cars the carburetor is adjusted to allow enough gasoline to feed through to the engine to prevent stalling when the throttle or accelerator is released or closed. This adjustment permits the engine to idle at between 400 and 500 r.p.m. Curve A shows the speed characteristic of the engine and those accessories which are directly driven at a 1:1 ratio by the engine. Curve B shows the speed characteristic of accessories driven by the engine at a 2:1 step-up ratio. In some cases where higher ratios are used the accessory speeds reach the ruinous value of 12,000 r.p.m. at top engine speed.

Curve C shows the group accessory speed using the invention shown in Figs. 1, 2, 5 or equivalent. The knee of the curve C is at or just to the left of the closed throttle ordinate, so that the effective part of the curve C is a horizontal line representing a speed value of 1000, 1200 or 1500 r.p.m., depending upon the step-up ratio selected between pulleys 12 and 13, the mass of linkage 42 and the constant of spring 47. The initial rise of curve C is a direct function of the drive ratio and it is an important part of the invention that this initial step-up provides optimum or entirely acceptable accessory operation at idling speed of the engine.

The optimum speeds of the individual accessories 91 through 93 and others although substantially constant need not be and usually are not the same. An optimum speed for each basic accessory such as the fan, generator, servo-oil pump, water pump, compressor and the like may be obtained by using a pulley of the proper diameter in each case bearing the correct relation to the linear speed of belt 94. Where gearing is substituted for belt drive the same relationships are selected.

While there have been described above what are at present considered to be the preferred embodiments of the invention, it will be apparent to those skilled in the art, that various changes and modifications may be made therein without departing from the spirit or scope of the invention. While the modifications discussed above clearly fall within the terms of one or more of the claims and are covered thereby, the wording of the several claims has been chosen so as to be generic to those other various changes and modifications which will be apparent to those skilled in the art.

I claim:

1. In combination, a constant speed rotary drive means powered by a variable speed engine having a relatively low normal idling speed comprising, an engine output shaft included in said engine, a counter shaft, means driven by said output shaft for rotating said counter shaft at a speed at least twice that of said engine output shaft, fluid drive means being driven by said counter shaft for rotating said rotary drive means, and means responsive to the speed of said rotary drive means connected to and activating said fluid drive means to maintain said rotary drive means at a constant speed for all speeds of said engine equal to and in excess of its idling speed.

2. The combination set forth in claim 1, said constant speed means comprising a disk-like member mounted on said counter shaft, a housing enclosing said member and fluid drive means to couple said housing and said member so that said disk-like member can move at variable speed and drive said housing at a substantially constant speed.

3. The combination set forth in claim 2, said disk-like member being an impeller for pumping oil within the housing, means carried by said housing and positioned to receive pumped oil and to be rotated thereby, valve means to vary the flow of the oil within said housing and governor means carried by said housing for controlling the operative position of said valve means.

4. The combination set forth in claim 3, said impeller having radial blades for acting on said oil, said means carried by said housing comprising buckets having a length greater than the width of said blades and an annular partition means positioned adjacent the radial edges of said blades and intermediate the ends of said buckets to guide the oil flow and serve as part of said valve means.

5. The combination set forth in claim 4, said governor means comprising a spring biased relatively massive centrifugal linkage pivoted on said housing and acting on said valve means.

6. In combination in a vehicle, an engine having a drive shaft, a counter shaft, means operatively associated with said drive shaft for rotating said counter shaft at a step-up drive ratio, speed change means comprising a first means driven by said countershaft, a second means providing a normally constant speed output, means coupling said first and second members in speed change relation, said coupling means constructed to cause said second member to rotate at a speed less than the speed of said countershaft, an accessory group carried by said vehicle and constructed to operate in conjunction with said vehicle, means connecting said second means providing normally constant speed output and said accessory group in driving relation whereby each accessory comprising said group is driven at a substantially constant speed over the effective driving range of said engine, said step-up drive ratio having a value such that said accessories are driven at approximately the said substantially constant speed at the idling speed of said engine.

7. The combination set forth in claim 6, said accessory group comprising a fan and a generator driven by said means connecting with said second means providing normally constant speed output.

8. The combination set forth in claim 7, said speed change means comprising governor means which controls the speed change relation affected by said coupling means between said first and second members within desired limits for the optimum operation of said accessory group.

9. The combination set forth in claim 8, said speed change means comprising slip means, said governor means mounted for rotation with said second members and acting on said coupling means in response to centrifugal force to vary the slippage and to maintain the speed of said second member effectively constant within a range of optimum operation of said accessories.

10. The combination set forth in claim 6, said speed changing means being a fluid coupling, said first member comprising an impeller fastened to said counter shaft and said second member comprising a housing mounted on said counter-shaft, oil acting to transfer force from said impeller to said housing, said impeller having blades for acting on said oil and said housing having fins to be acted on by said oil.

11. The combination set forth in claim 10, centrifugal governor means mounted for rotation by said second member valve means mounted within said housing and acted on by said governor means to control the flow of oil acting on said housing.

12. In combination, a constant speed device for driving automotive accessories comprising a shaft, an impeller fastened to said shaft and rotated thereby and carrying radial blades, a housing surrounding said impeller and rotatably mounted on said shaft, valve means comprising an annular guide plate having a central aperture and a disk member slidably mounted on said shaft and arranged to close the central aperture of said annular guide plate, said housing carrying vanes extending on each side of said guide plate, a liquid within said housing for transferring force from said blades to said housing, a governor linkage pivoted to said housing and arranged to act on said disk member to move it longitudinally of said shaft to decrease the flow of liquid within said housing with an increase in rotational speed of said housing and a spring bias for said governor linkage tending to act normally on said disk member to increase the flow of said fluid whereby said housing rotates at a constant governed speed.

13. The combination set forth in claim 12, bearing means for mounting said housing on said shaft and power take off means attached to said housing.

14. The combination set forth in claim 13, a plurality of nozzling means carried by said impeller on its periphery to increase the impact of the pumped liquid on the vanes within the housing.

References Cited in the file of this patent
UNITED STATES PATENTS

| | | |
|---|---|---|
| 1,490,380 | Gilson | Apr. 15, 1924 |
| 1,657,747 | Halmet | Jan. 31, 1928 |
| 2,130,957 | Kingsley | Sept. 20, 1938 |
| 2,195,561 | Dickerson | Apr. 2, 1940 |
| 2,383,872 | MacPherson | Aug. 28, 1945 |
| 2,408,988 | McElroy | Oct. 8, 1946 |
| 2,620,636 | Stanton | Dec. 9, 1952 |
| 2,769,303 | Lucia et al. | Nov. 6, 1956 |